Sept. 20, 1971　　　　　　　G. MAYER　　　　　　　3,605,921
　　　DRILL FOR PRODUCING HOLES FOR PLANTS IN
　　　　　FLOWER POTS OR OTHER CONTAINERS
Filed Sept. 11, 1969　　　　　　　　　　　　2 Sheets-Sheet 1

INVENTOR.
GEORG MAYER

BY
Woodhams, Blanchard & Flynn
ATTORNEYS

Sept. 20, 1971  G. MAYER  3,605,921
DRILL FOR PRODUCING HOLES FOR PLANTS IN
FLOWER POTS OR OTHER CONTAINERS
Filed Sept. 11, 1969  2 Sheets-Sheet 2

INVENTOR.
GEORG MAYER
BY
Woodhams, Blanchard & Flynn
ATTORNEYS

United States Patent Office 3,605,921
Patented Sept. 20, 1971

3,605,921
DRILL FOR PRODUCING HOLES FOR PLANTS IN FLOWER POTS OR OTHER CONTAINERS
Georg Mayer, Bolheim, Germany, assignor to Firma Mayer KG, Heidenheim-Mergelstetten, Germany
Filed Sept. 11, 1969, Ser. No. 857,169
Claims priority, application Germany, Sept. 11, 1968, P 17 82 509.1
Int. Cl. E21c 13/04; A01c 11/00
U.S. Cl. 175—108                            6 Claims

ABSTRACT OF THE DISCLOSURE

A drill for producing holes for plants in flower pots or other containers having a shank and a drill body wherein the drill body has at least one rising, worm-shaped spiral flute and the body portion between the spiral flute extends from the tapered lower end of the drill body up to its upper end.

---

The invention relates to a drill for automatically producing holes for plants in flower pots or other containers, said drill having a shank and a drill bit or body portion.

The foregoing type drills usually work in soil which was just previously filled into a flower pot or other type container. It is desirable that the loosely piled soil be in a packed state before the plants are inserted. The known type of drills do not transport the soil upwardly and outwardly of the pot but throw the soil sidewardly to further compress the contents in the pot. Therefore, the different degrees of firmness of the soil, which is adjusted to the respective type of plant to be inserted therein, cannot be obtained by using this type of drill.

It is the purpose of the invention to produce a drill of the above-described type which makes possible, in a simple manner, to maintain any desired firmness of the soil contained in the pot during the drilling of a hole for a plant.

According to the invention, the purpose is attained by means of a drill, the drill body of which has at least one rising, spiral flute extending from the tapered lower end of the drill body up to its upper end.

If the drill of the invention is drilled into the soil in the direction of rotation of its spiral flute, it brings the drilled soil upwardly through the spiral flute. The soil is thereby placed, depending on the height adjustment of the drill body, as desired, at the edges of the drilled hole or is thrown from the pot. This permits a differentiated dosing of the contents in the pot and thus of the firmness of the soil. A packing of the soil in the pot is achieved in a simple manner by reversal of the direction of rotation of the drill of the invention. In the spiral flute of the drill body, the soil is transported downwardly and thus the wall and base layer of the soil in the pot is made firm. In both cases, the wall of the hole for the plant is constructed smoothly and durable by the outer surfaces of the drill body. This is, among others, advantageous during the repotting from one size pot to a pot which is only slightly larger than said first pot. Since the change of the direction of rotation can be controlled automatically in a simple manner as desired and can also be switched over by an auxiliary force which inserts the plants, the drill of the invention permits the quick adaptation of the entire unit to different type plants and their needs. Thus, a packing of the filled-in soil by hand or by means of devices and a second filling of the pots after the planting and watering process is no longer necessary. This saves working time and operating devices.

The lower end of the drill body is constructed advantageously as a transverse blade. The drilled hole thereby develops a smooth base which makes easier the insertion of plants with pot or root balls.

According to an advantageous further development of the drill of the invention, the transverse blade can have conical-concave flanks. The transverse blade makes thus easier the penetration of the drill body and the transporting of the soil in the spiral flutes independent of the direction of rotation of the drill.

In a preferred embodiment the ideal surface of the drill body forms a cone which is tapered toward its lower end. Thus the hole for a plant produced by said drill has a shape which corresponds to a common pot ball. Since, furthermore, the walls of the conical hole for a plant extend approximately parallel to those of a common conical-shaped flower pot, the soil around the hole has an even degree of firmness.

The drill body can advantageously be provided with a flat top surface which is perpendicular to the shank and which supports each desired distribution of soil in both directions of rotation of the drill.

The drill can, together with several similar drills, be combined in a multiple drilling unit having a drilling arrangement corresponding to the container arrangement for the simultaneous drilling of the soil in a number of containers, each of the drills being coupled through gearings and can be driven together. Such a multiple drilling device permits an economical potting and reporting of large amounts of similar type plants because the size of the holes for the plants and the setting firmness of the soil in all containers is thereby rendered the same.

An exemplary embodiment of the invention is illustrated in the drawings, in which.

Figure 1:
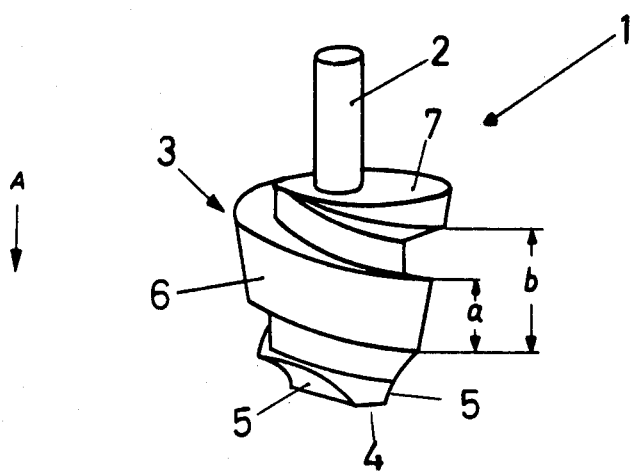
FIG. 1 is a perspective illustration of a drill of the invention.

The drill 1 has a shank 2 which can be chucked at various heights and a drill body 3. The drill body 3 has at its lower end a flat transverse blade 4 with conical-concave flanks 5. The flanks 5 transform into a worm-shaped spiral flute 6 and the body portion between the spiral flute has a trapezoidal profile which extends counterclockwise relative to the direction of penetration A of the drill 1. In the same direction, the spiral flute 6 and the body portion tapers off in such a manner that the ideal external surface of the drill body 3 extends conically.

The outside of the trapezoidal profile of the body portion of the drill body which coincides with the ideal surface of the drill body 3, has a length $a$ which is more than half of the path height $b$ of the spiral flute 6.

The drill body 3 has a smooth surface 7 at its upper end which is perpendicular to the shank 2.

Figure 2:
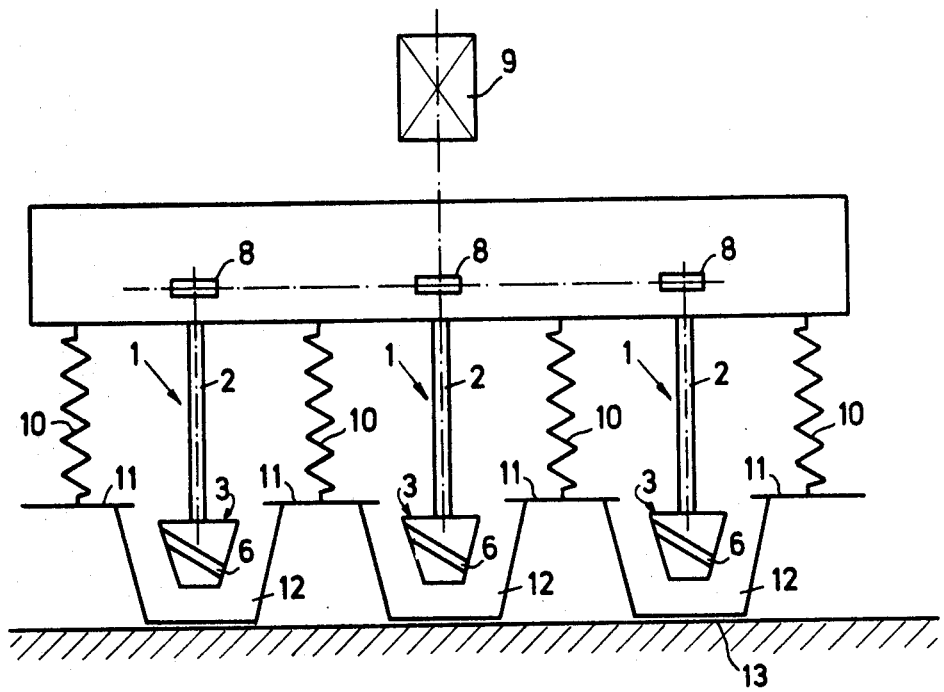
FIG. 2 is a schematic arrangement of several drills according to FIG. 1 in a multiple drill arrangement.

FIG. 2 illustrates a multiple drill arrangement having three drills 1 arranged in a side-by-side relationship. The shafts of the drills 1 are coupled by schematically-indicated gearing 8 and intermediate gearing 8A and are driven simultaneously by a common driving mechanism 9. The driving mechanism 9 permits thereby a change in the direction of rotation of the drills so that the multiple drill arrangement can be used for both drilling of holes for plants and also for packing the soil in the pots.

Support plates 11, which are loaded by springs 10 are arranged between the drills 1 on the multiple drill arrangement, engage the flower pots 12 and press same against the support 13 during the drilling process.

The invention is not limited to the exemplary embodiment. The spiral flute of the drill can also extend in a clockwise direction since the drill in any case is used in two directions of rotation. The ideal surface shape of the drill body can also be cambered cylindrically or convexly depending on the form of the pot or root balls which are to be inserted or on the shape of the container. In place of a transverse blade, the drill can be tapered concentrically at its lower end. Further, the drill body can be made of either plastic or metal.

The number and the arrangement of the drills of the invention in a multiple drill arrangement can vary depending on the purpose of use. For example, the drills can be arranged in several rows side by side or one behind the other. Form and arrangement of the support plates and of the pot holding means can thereby also vary.

All characteristics disclosed in the description and the drawings, including the structural details, can also be important to the invention in other combinations.

The embodiments of the invention in which an exclusive property or privilege is claimed are defined as follows:

1. A drill for producing holes for plants in flower pots or other containers comprising a shank and a tapered drill body, said drill body having at least one rising, worm-shaped spiral flute and the body portion between the spiral flute extends from the tapered lower end of the drill body upto its upper end, said lower end of said drill body including means defining a transverse blade having conical-concave flanks.

2. A drill according to claim 1, in which the ideal surface of the drill body forms a cone which is tapered toward the lower end.

3. A drill according to claim 1, in which the drill body has a flat top which is perpendicular to the shank.

4. A drill according to claim 1, in which the drill body consists of metal.

5. A drill according to claim 1, in which the drill body consists of plastic.

6. A drill according to claim 1, in which a plurality of said drills are combined in a multiple drilling unit having a drilling arrangement corresponding to the container arrangement for a simultaneous drilling of the soil in a number of containers, said drills being coupled by gearing for simultaneous driving.

References Cited

UNITED STATES PATENTS

| | | | |
|---|---|---|---|
| 2,709,573 | 5/1955 | Reed | 175—394X |
| 2,826,003 | 3/1958 | Oki et al. | 47—1 |
| 2,829,468 | 4/1958 | Wingerden et al. | 47—37.6X |
| 3,108,645 | 10/1963 | Hill | 175—108 |

DAVID H. BROWN, Primary Examiner

U.S. Cl. X.R.

175—394; 47—1